UNITED STATES PATENT OFFICE.

LOUIS RABINOVITZ, OF BROOKLYN, NEW YORK, ASSIGNOR TO ELLIS-FOSTER COMPANY, A CORPORATION OF NEW JERSEY.

COUMARONE RESIN AND PROCESS OF MAKING SAME.

1,416,062.  Specification of Letters Patent.  Patented May 16, 1922.

No Drawing.  Application filed August 12, 1919.  Serial No. 316,979.

*To all whom it may concern:*

Be it known that I, LOUIS RABINOVITZ, a citizen of the United States, residing at 1391 Pacific St., Brooklyn, in the county of Kings and State of New York, have invented certain new and useful Improvements in Coumarone Resin and Processes of Making Same, of which the following is a specification.

This invention relates to a process of making paracoumarone or paraindene, known commercially under the name of coumarone resin and further relates to products of a polymerized nature, all as hereinafter more fully illustratively described and as set forth in the appended claims.

The present invention comprises the polymerization of the coumarone of indene material by any suitable means, to produce either a plastic material or a solid body, and the subsequent hardening of such material by distillation of the liquid or softer portions, such distillation being effected in vacuum if desired, or in a current of steam or other inert vapor or gas, and to the product of such treatment.

Coumarone resin is the name given to the product obtained by the polymerization of coumarone and idene contained in solvent naphtha or crude coal tar naphtha and in certain benzols. These bodies are found mainly in the fraction distilling between 160–180° C. This fraction is preferably prepared and is treated with a polymerizing agent such as aluminum chloride and the like, but which preferably in the present instance is sulphuric acid. This acid may be 66° Bé., strength and is added in the proportion of about one per cent, calculated on the total amount of the fraction of naphtha employed. The acid is added preferably slowly under constant stirring and owing to the bulk of the solvent material present only slight, if any, cooling is required. The reaction or polymerization is relatively rapid and the time required therefor is brief. The resinous body which forms goes largely into solution in the naphtha, although a certain amount may become sulphonated to a tar or sludge and be found in the sulphuric acid residue which settles to the bottom. The acid sludge is drawn off. It is sometimes necessary to settle for several hours in order to allow the acid to collect so that it may be drawn off effectively. The naphtha solution of the resin is washed to remove traces of the acid and is then subjected to distillation. Preferably this is conducted with the aid of steam and when the naphtha has been removed in this manner the residue of crude resinous material which is usually plastic or soft and pasty is collected and transferred to a vacuum distillation apparatus. It is distilled preferably under a vacuum of about 29 inches, until the proper melting point of the resin is reached. Sometimes it is necessary to distill more than one-half the weight of the crude resin, before a hard product is secured.

The distillate from the vacuum chamber is ordinarily a heavy viscous liquid which is substantially unsaponifiable and is quite largely saturated and is a by-product of use in the arts.

An example, given purely for the purpose of illustrating procedure falling within the scope of the invention, follows:

1000 parts of solvent naphtha are treated with 10 parts of 66° Bé., sulphuric acid, the acid being added in a thin stream under constant agitation. After one-half hour the acid is drawn off and the naphtha is washed with a five per cent solution of alkali. The mixture is allowed to settle, the alkali solution is drawn off and the solvent naphtha is distilled with superheated steam until the residue is freed therefrom. The thick viscous resin left behind is then hardened in any suitable manner. Thus it may be distilled under a vacuum of 29 inches until the thermometer reads around 180° C. At this point the resin in the vessel is sufficiently hard to be used in the arts. If a harder resin is desired, the distillation is carried on further. The liquid material obtained by distillation of a particular sample of the soft resin at 180° C., under a high vacuum of about 29 inches, possessed an iodine number of 24, while the resinous material remaining behind had an iodine number of 47. The viscous resin mass may be hardened by distillation in steam at about atmospheric pressure, but the product is liable to be darker colored.

If a substantially lower degree of vacuum than 29 inches is employed, and a correspondingly higher temperature, the hard resin produced may be somewhat darker (probably due to some decomposition). By reasonably careful work, and when using a vacuum approaching 29 inches, products having iodin numbers below 50 may be made. Highly useful products can be made having iodin numbers between 46 and 50.

It is advisable in the distillation step, not to use a temperature over 200° C., or at most 220° C., since at higher temperatures considerable decomposition may occur, and the value of the product lowered.

The viscous material (without hardening) may be used as an addition to linseed or Chinese wood oil in the manufacture of paints with which oils it blends nicely.

The foregoing description and example has been given for illustrative purposes, but it should be understood that I do not wish to be limited thereby to the details of any portion of the procedure but may make such modifications or omit such steps as may be desired, all with respect to the scope of the present invention as expressed by the claims herein.

The products produced as herein described, having iodin numbers not over about 50, are found to be highly suitable for use in the arts, as ingredients of liquid coating compositions, plastic compositions and the like.

To recapitulate, the invention comprised herein in its specific aspects involves the treatment of a fraction of solvent naphtha containing indene and coumarone with a polymerizing or resinifying agent such as sulphuric acid or aluminum chloride and the like, adding the acid gradually with agitation and collecting the resin as a solution in the solvent naphtha, freeing the latter from acid material and removing the solvent naphtha by distillation, preferably with the aid of steam, and thereupon distilling the resinous material under vacuum to remove a substantial proportion of the liquid constituents; thereby in some instances increasing the iodin number of the resinous material and affording a product suitable for varnish or wood coating compositions having a sufficient amount of unsaturated components to show drying tendencies especially in the presence of drying oils and siccatives; and the invention further relates to the product obtained by such process, namely, a resin having a higher iodin number than the polymerized oily material associated with it, in the crude state, and especially to products having iodin numbers between 45 and 50.

The present invention, as described in the illustrative example herein, relates to the treatment of coumarone material (by which I refer to products containing coumarone and indene or similar polymerizable material) with a suitable polymerizing agent, such as sulphuric acid and in subjecting the products of polymerization to heat treatment, as for example, to distillation preferably under pressure below atmospheric, whereby a harder resinous product is obtained and the invention includes the product of such process, namely, a coumarone resin which has been hardened by removal of a material part of the softer portions of the liquid constituents, as for example, by distillation under reduced atmospheric pressure, and to a product having an iodine number in some cases, materially higher than that of the original soft resin. The scope of the invention is indicated by the claims herein, and not by the example which is given for the purpose of illustration only.

It may be called to attention that my researches in the field have been conducted with solvent naphtha produced in North America. It may be that the solvent naphtha, as produced in Germany (where different coals and to some extent different coking processes are used) would behave somewhat differently from the North American varieties, but I claim the application to the process to such solvent naphtha as it is applicable to, wherever produced.

The present case is filed as a substitute for my co-pending application 97,011 filed May 12, 1916.

I claim:

1. The improvement in the manufacture of resin by polymerization, from aromatic hydrocarbon liquids containing substantial amounts of coumarone and indene, which comprises gradually adding to such liquids sulphuric acid of approximately 66 degrees Bé. in the absence of substantial amounts of more dilute sulphuric acid, while thoroughly agitating the liquid mass, settling, removing the sulphuric acid material from the reaction liquid, washing with alkali solution, distilling off the solvent naphtha, and heating the residue under a vacuum approaching 29 inches to a temperature sufficient to leave a hard resin.

2. A process of making coumarone resin which comprises polymerizing the coumarone contained in solvent naphtha by sulphuric acid of approximately 66 degrees Bé. in the absence of substantial amounts of more dilute sulphuric acid, while thoroughly agitating the mass, and thereafter hardening the resin by heating to about 180 degrees C. in a high vacuum.

3. A process of making resin which comprises polymerizing the coumarone and indene contained in solvent naphtha whereby a soft resinous material is produced, and then hardening the resinous material by distillation under a vacuum of about 29 inches.

4. A process of making resin which comprises polymerizing the coumarone and indene contained in solvent naphtha whereby a soft resinous material is produced and then hardening the resinous material by distillation at a temperature below 200 degrees C. in a high vacuum.

5. A hard coumarone resin having an iodin number below 50.

6. A hard coumarone resin having an iodin number of about 47.

In testimony whereof I affix my signature.

LOUIS RABINOVITZ.